Aug. 26, 1969   W. H. MORRISSEY   3,462,900
MOLDING AND MOLDING SYSTEM

Filed Aug. 18, 1965   2 Sheets-Sheet 1

INVENTOR.
WILLIAM H. MORRISSEY
BY
James M. Heilman
ATTORNEY.

Aug. 26, 1969 W. H. MORRISSEY 3,462,900
MOLDING AND MOLDING SYSTEM
Filed Aug. 18, 1965 2 Sheets-Sheet 2
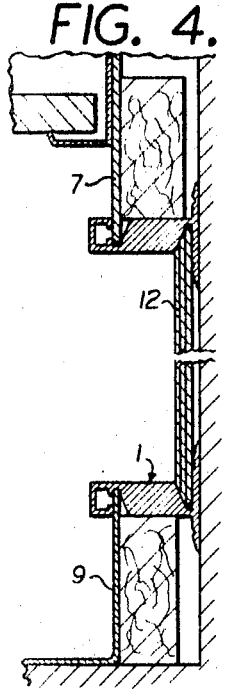
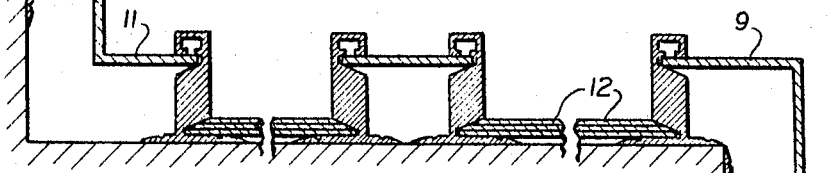
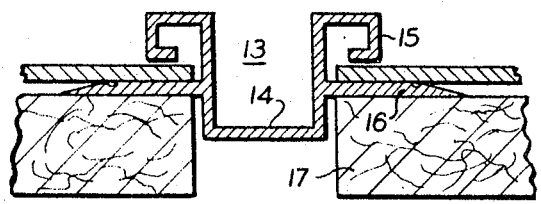
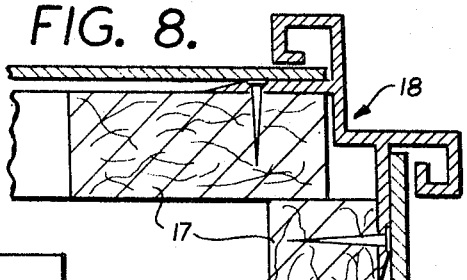
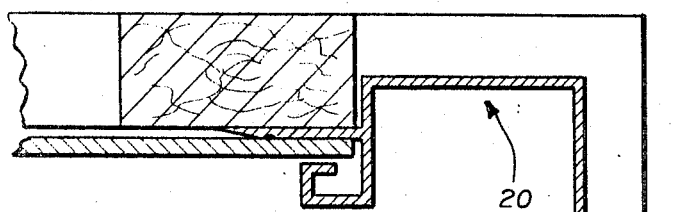
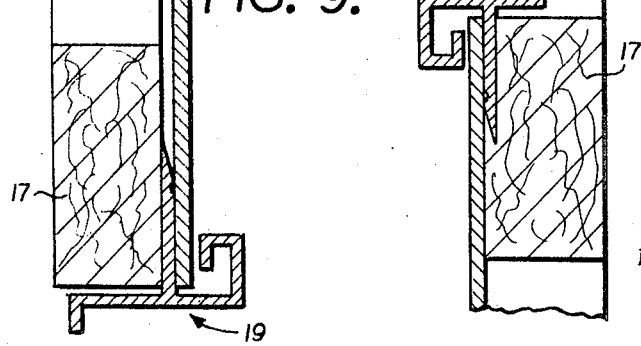
INVENTOR.
WILLIAM H. MORRISSEY
BY *James M. Heilman*
ATTORNEY.

United States Patent Office 3,462,900
Patented Aug. 26, 1969

3,462,900
MOLDING AND MOLDING SYSTEM
William H. Morrissey, Norwalk, Conn., assignor to U.S. Plywood-Champion Papers Inc., New York, N.Y., a corporation of New York
Filed Aug. 18, 1965, Ser. No. 480,676
Int. Cl. E04f 13/08, 19/02
U.S. Cl. 52—312
2 Claims

ABSTRACT OF THE DISCLOSURE

A system of covering or decorating with plywood, cement-asbestos, or fiber or fibrous boards, high pressure laminates, etc., the interior surface of a room, including the ceiling, using a single type inexpensive molding which will permit a staccato of changing planes and/or alternating colors at regular intervals wherein narrow of scrap strips may be used as feature strips and may emphasize one plane while minimizing the adjacent, but offset plane.

---

The object of this invention is to provide one simple molding which will provide all of the molding requirements in a molding system.

Another object of this invention is to provide a molding which will permit a staccato of changing planes and alternating colors at regular intervals wherein narrow or scrap strips may be used as feature strips, and may emphasize one plane while minimizing the adjacent, but staggered plane.

A further object is to provide a molding which will provide two separate and distinct planes and will allow the creation of distinctive color harmonies or contrasts, articulated joints, and accentuated recessed areas.

A further object of this invention is to provide a molding system wherein the recessed joint may be obtained by putting the molding section between, rather than on furring strips, thereby reducing the thickness of the wall, permitting blind fastening, and reducing the quantity of furring required.

With the foregoing and other objects in view as will appear from a reading of the following specification and claims, the invention resides in the novel arrangement and combination of parts and in the details of construction and process of manufacture hereinafter described and claimed, it being understood that changes in the precise embodiment of the invention may be made within the scope of what is claimed without departing from the spirit of the invention. It will be further understood that the invention is susceptible of embodiment in many and various forms, some of which are illustrated in the accompanying drawing, and that the structural details or particular steps of the method herein set forth may be varied to suit particular purposes and still remain within the inventive concept.

Referring to the drawings, FIG. 1 is a side view of a portion of a wall, or a wall section.

FIG. 4 is a vertical cross-sectional view taken on the line 2—2 of FIG. 1 but showing instead a recessed panel assembly.

FIG. 5 is a horizontal cross-sectional view taken on the line 3—3 of FIG. 1 but likewise showing instead a recessed panel assembly.

FIG. 7 is a modified form of molding being also a divider strip.

FIG. 8 is an outside corner.

FIG. 9 is an end cap, and

FIG. 10 is an inside corner.

Figure 6:
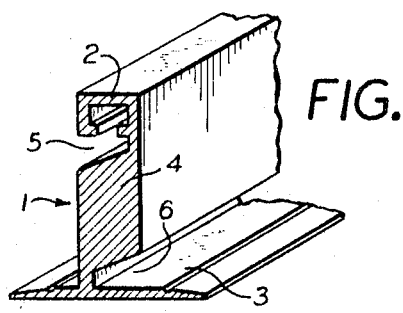
FIG. 6 is a detailed view of the molding used in FIGS. 1 to 5.

Referring in detail to FIG. 6, numeral 1 represents the molding having a head portion 2, and foot 3, and body 4. Between the head 2 and body 4 is a recess 5 having one tapering side, while between foot 3 and body 4 is a recess 6 likewise having one tapered side.

This same molding element is used throughout FIGS. 1 to 5 in various forms of divider strips, inside moldings, and outside molding.

Figure 2:
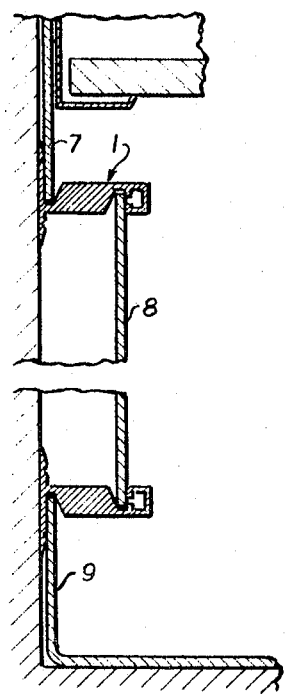
FIG. 2 is a cross-sectional view of a raised panel assembly taken on the line 2—2 of FIG. 1.

Referring to FIG. 2, the molding 1 supports a short recess panel 7 at the ceiling on the one side and a raised panel 8 at its head portion. Likewise at the floor level, recess section 9 is supported in the foot section.

Figure 3:
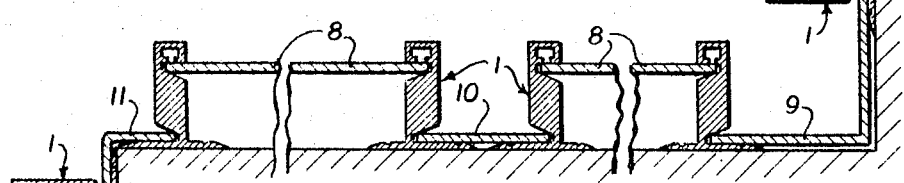
FIG. 3 is a horizontal cross-sectional view of a raised panel assembly taken on the line 3—3 of FIG. 1.

In FIG. 3, a recessed reveal 10 is supported between two adjacent molding elements in their foot portions, while two raised panels 8 are supported by the head sections. Inside corner 9 is supported by the foot section, and outside corner 11 at the opposite corner in the foot portion of the molding.

FIG. 4 again is a vertical section taken on the same line 2—2 in FIG. 2, but in this case the panel, instead of being raised, is recessed, and the reveal is raised. Also, FIG. 4 shows the versatility of the molding, i.e., in addition to the molding being able to receive snugly a thin panel 8 such as a ⅛ inch cement asbestos board (sold under the trademark "Glasweld" of United States Plywood Corporation), thicker panels such as ¼" or ⅜" plywood 12 may be received in some or all of the spaces between the molding. This arrangement is just the reverse of that shown in FIG. 2, and even the inside corner is spaced from the actual corner.

Figure 1:
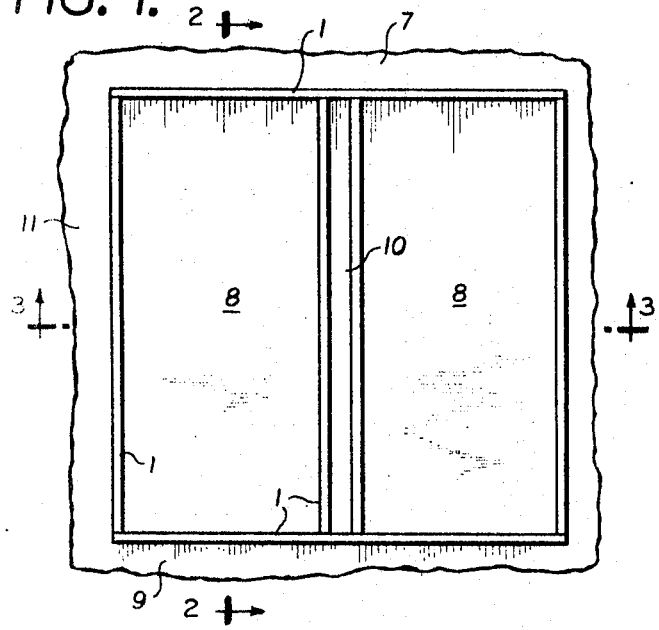

FIG. 5 is also the reverse of FIG. 3, and is taken on the line 3—3 of FIG. 1. The only difference in FIG. 5 over FIG. 3 is that the panels here are recessed while the reveals are raised, and again the recessed panels are shown as three-ply plywood rather than a cement asbestos or other type of panel.

This molding with its interchangeable features can be used in many situations and in many types of environment. It will provide the staccato effect which is so important to break up the monotony of plane walls. Harmonizing or contrasting colors may be used in the paneling and the reveals as desired. For example, reveal 7 at the ceiling can be identical in size and color with reveals 9 and 10 if desired, or may be a contrasting color.

In connection with the modified form shown in FIG. 7, this divider strip may be used between rather than on furring strips, thereby reducing the thickness of the wall. This also permits blind fastening and reduces the quantity of furring required.

FIGS. 8, 9 and 10 illustrate an outside corner, an end cap, and an inside corner, respectively.

The divider strip 13, as illustrated in FIG. 7 has a depressed section 14 overhanging fingers 15 and intermediate foot 16. The panel is inserted between the overhanging head 15 and foot 16. The foot 16 is secured to stud or furring strip 17 by any conventional means.

In the outside corner 18 (FIG. 8), and cap 19 (FIG. 9), the foot is again fastened to stud or furring strip 17. Likewise, in connection with corner 20, the foot is fastened to the stud or furring strip 17 and the panel secured between the head and the foot.

It is therefore seen that an improvement has been made in new and novel molding systems which are simple in construction, economical to manufacture and simple to install. Molding of extruded aluminum is preferred, but other metals may be used with equally good results. Other materials, such as wood or plastic may likewise be used. The system may be used in interior or exterior applications, and the results have been maximum flexibility and variety through the interchangeable use of this type of molding.

The embodiments of the invention in which an exlusive property or privilege is claimed are defined as follows:

1. An interchangeable molding system comprising an extruded aluminum molding having a relatively thick body, a relatively thin head, and a relatively thin elongated foot, said head and said body forming a recess therebetween having a susbtantially straight face on one side of said recess and a sloping face on the other side to receive a panel, said body and said foot likewise forming a similar recess having a substantially straight side and a sloping side to receive a second panel, said recess between said body and said foot being at the opposite end of said body, the top of the head, the head opening and the foot opening all being in different planes, said panels being received in said recesses in alternating fashion whereby the panels will be in two different planes.

2. An interchangeable molding system comprising an extruded aluminum molding having a relatively thick body, a relatively thin head with a down-turned edge, and a relatively thin foot, said foot extending on each side beyond the limits defined by the relatively thick body, said head and said body forming a recess therebetween having a substantially straight face on one side of said recess and a sloping face on the other side to receive a panel, said down-turned edge of said head permitting the inserted panel to be spaced a substantial distance from the top portion of said head and to provide a separate and distinct plane therefrom said body and said foot likewise forming a similar recess having a substantially straight side and a sloping side to receive a reveal, said recess between said body and said foot being at the opposite end of said body and opening in a direction directly opposite to the recess between the head and the body, the top of the head, the head opening and the foot opening all being in different planes, panels and reveals being received in said recesses in alternating fashion whereby the panels and reveals will be in two different planes, in both a vertical and a horizontal direction whereby harmonizing and/or contrasting colors may be obtained with additional shadow lines caused by the planes of the head, the panels, and the reveals.

References Cited

UNITED STATES PATENTS 3,140,763   7/1964   Edelstein _____ 52—235

FOREIGN PATENTS 119,586   3/1945   Sweden.

FRANK L. ABBOTT, Primary Examiner

JAMES L. RIDDELL, Jr., Assistant Examiner

U.S. Cl. X.R.

52—98, 235, 288, 403, 495